Patented Aug. 18, 1953

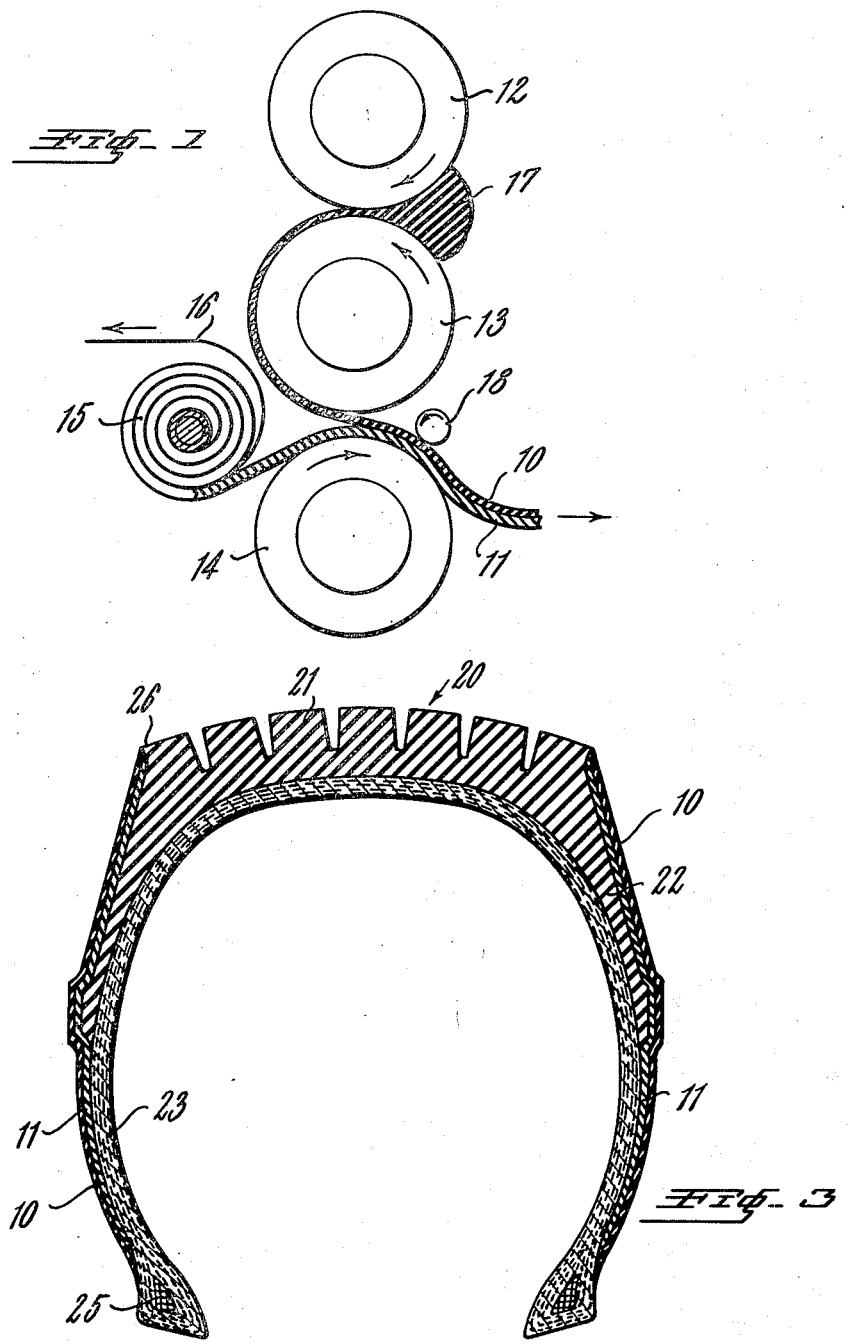

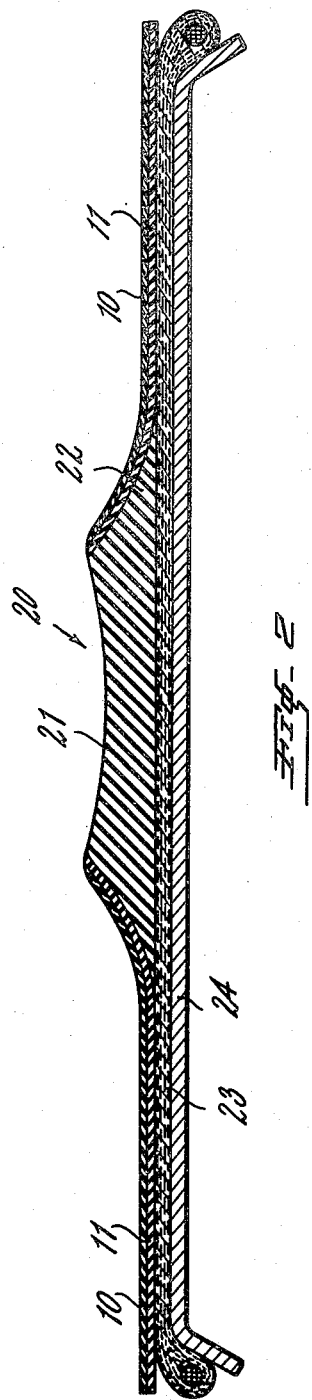

2,649,134

UNITED STATES PATENT OFFICE 2,649,134

METHOD OF MAKING PNEUMATIC TIRES

William A. Steinle, Detroit, Mich., assignor to United States Rubber Company, New York, N. Y., a corporation of New Jersey Application January 23, 1951, Serial No. 207,300

5 Claims. (Cl. 154—14)

This invention relates to a method of making pneumatic tires and more particularly it relates to a method of making a pneumatic tire having a relatively thin outer protective layer of ozone resistant or weather resistant composition, such as neoprene synthetic rubber.

Pneumatic tires as conventionally constructed are subject to checking or cracking of the sidewalls and cracking of the groove bases. This is believed to be due principally to oxidative attack, and is aggravated by the presence of ozone in the atmosphere. Such checking or cracking is observed to be most severe when the tire is exposed to sunlight. The checking of the tire sidewalls and grooves not only spoils the appearance of the tire, but leads to weakening of the tire sidewall, and may be a cause of premature and unexpected failure of the tire in service. This deterioration not only takes place while the tire is in use, but is also a troublesome factor in new unused tires while in storage awaiting sale. If stored under improper conditions, or for unduly long periods, the tire may become unsightly and unsaleable as a result of such cracking.

For the foregoing reasons, it has been desired to provide a tire made of ozone resistant or weather resistant material, such as neoprene synthetic rubber, that is, the synthetic rubber resulting from polymerization of 2-chlorobutadiene,1-3, as disclosed for example in U. S. Patent 1,950,432. Neoprene is characterized by exceptional immunity to the deteriorating action of ozone and sunlight, and a tire made from this material is therefore not subject to checking. However, it has not been considered practical to manufacture a tire from neoprene, because of the relatively high cost of neoprene and because the physical and chemical properties of the material do not lend themselves to conventional tire manufacturing operations. For these reasons neoprene tires have never come into general commercial use, insofar as we are aware.

The sidewall checking and groove cracking problem could be relieved by providing a rubber tire with a thin outer layer of neoprene covering the sidewalls or tread grooves of the tire, but this attempted solution to the problem is confronted with the difficulty that the adhesion of neoprene to the rubber stocks used in tires is insufficient to provide a strong, unitary, solidly knit, composite assembly from which the outer neoprene layer will not separate in service.

Accordingly, the principal object of the present invention is to provide a method of making a tire having a neoprene veneer, from which the neoprene layer does not tend to separate in service.

Another object is to provide a method of applying a neoprene layer to a tire which results in firm adhesion of the neoprene, whether the underlying portion of the tire is made from natural rubber stock, synthetic rubber stock (especially GR–S, the rubbery copolymer of styrene with butadiene), reclaimed rubber stock, or various mixtures of the foregoing.

Still another object is the provision of an improved method of applying a neoprene veneer to a tire which achieves a firm bonding of the neoprene without any necessity for superimposing adhesive substances over the tire.

A further object is to provide a method of making a tire which is convenient and economical.

The manner in which the invention accomplishes the foregoing and other objects and advantages will be made evident in the following detailed description, which is intended to be read with reference to the accompanying drawings, wherein Fig. 1 is a diagrammatic representation of a method of forming a hot laminated neoprene strip for superimposition on a tire in accordance with the invention;

Fig. 2 is a transverse sectional elevation of the laminated neoprene strip associated with a tire tread portion and carcass on a building drum; and Fig. 3 is a transverse sectional elevational view of a tire casing embodying a neoprene veneer sidewall.

The invention contemplates manufacture of a pneumatic tire by forming the tread portion of suitable rubber stock, conveniently by extruding the tread in continuous lengths of the proper profile, and cutting such lengths to proper size. To form the protective neoprene layer, for example on a sidewall, a strip of rubber stock having physical properties suitable for the underlying portion of the sidewall is formed, most conveniently and most economically by a calendering operation, and a thin layer of neoprene stock is applied in a heated condition to the under-sidewall strip, and the two layers are immediately pressed firmly together. It has been found that such lamination of the neoprene layer to the under-sidewall layer, under the simultaneous influence of heat and pressure, results in formation of a firm adhesive bond between the two layers which is capable of withstanding the extreme flexing and occasional scuffing to which the sidewall is subject in service. The hot pressure laminate of neoprene and under-sidewall stock, in the form of strips of suitable length and width, is then associated with the previously formed tread portion and applied to a raw tire carcass, suitably on a collapsible tire building drum. The raw tire asesmbly may then be shaped and vulcanized, employing the equipment and procedural steps used for ordinary tires.

Referring to the drawings, Fig. 1 shows a method of associating a vulcanizable neoprene veneer strip 10 with an under-sidewall strip 11 by means of a calender having three rolls 12, 13 and 14. The under-sidewall strip 11 is preferably formed by calendering a vulcanizable rubber stock into a thin sheet of specified thickness. The sheet is wound up into a roll 15 with a cloth liner 16 to prevent adhesion. The under-sidewall strip 11 is fed continuously from the roll 15, which is rotatably supported on suitable means next to the calender, into and through the space between the lower roll 14 and the middle roll 13 of the calender. The cloth liner 16 is simultaneously removed to a suitable wind-up device. A bank 17 of heat-curable compounded neoprene stock at the nip of the upper calender roll 12 and middle roll 13 supplies stock for formation of the sheet 10 of neoprene by shearing action of the rolls 12 and 13 on the stock, and the sheet 10 passes around the middle roll 13 and is brought into contact with the under-sidewall strip on the upper surface of the lower roll 14. The upper and middle rolls are heated to an elevated temperature, suitably within the range of about 170 to 210° F., and preferably about 190° F. The rolls 13 and 14 are spaced sufficiently so that the two strips 10 and 11 pass therebetween without having appreciable pressure exerted thereon. The unvulcanized neoprene strip 10 is in a soft, plastic condition as a result of contact with the heated rolls, and in this hot soft state it is pressed firmly into intimate contact with the under-sidewall layer 11 by means of a driven pressure roll 18, which presses the strips 10 and 11 together against the surface of the lower roll 14 as the strip emerges from between the middle roll and the lower roll. It has been found that pressures of 5 to 10 lbs. per square inch applied when the neoprene strip is in a hot, highly plastic condition, are satisfactory for causing a secure union of the two stocks so that they display no tendency to peel or separate in the final tire, even under the severest conditions of test service. The resulting laminate may be thereafter cut into strips of suitable length and width for forming the tire sidewalls.

A tire tread portion 20 made of abrasion resistant vulcanizable rubber stock of the character commonly used for tire treads is formed, suitably by an extrusion operation, with a relatively thick center portion 21 which will correspond to the final tire tread proper, and with tapered side portion 22 which will extend partly down each sidewall of the tire in the final shaped and vulcanized assembly. Strips of the neoprene laminate are disposed along each side of the tread portion 20 with the under-sidewall strip 11 of the laminate in contact with the tapered side portions 22 of the tread in over-lapping relation and with the neoprene layer 10 facing upwardly. This assembly may be accomplished by placing the tread strip 20 on the center portion of a raw tire casing 23 assembled in band form on the surface of a conventional tire building drum 24, and thereafter adding the two laminated sidewall strips. The various portions are stitched or pressed firmly together on the drum to insure good adhesion. The contacting surfaces may be moistened with gasoline before assembly to promote adhesion. Alternatively, the tread strip and sidewall strips may be assembled together on a suitable working surface and thereafter applied as a unit to the raw tire carcass on the building drum.

After assembling the tread and laminated sidewall with the carcass to form the raw tire casing in band form, the tire casing may be shaped in annular toroidal form on a curing bag in the usual vacuum shaping box, and then vulcanized in a conventional tire mold. Alternatively, the raw tire casing in band form may be inserted in that type of vulcanizing mold containing an integral curing bag which shapes the tire casing directly in the final vulcanizing mold.

As shown in Fig. 3, in the final tire the outer thin veneer 10 of neoprene forms a protective cover over the sidewall of the tire extending from the beads or rims 25 to the marginal edges 26 of the road-contacting portion of the tread.

Actual road testing of a tire made in the foregoing manner under severe service conditions has demonstrated that the sidewall is highly resistant to weather checking as a result of the protective neoprene layer, and furthermore the neoprene layer, because of the way in which it is integrally united with the rubber under-sidewall portion, has no tendency to peel or separate under the influence of the continual severe and rapid flexing to which the tire sidewall is subject in service.

Adequate adhesion of the neoprene veneer to the under-sidewall stock is obtained by applying heat and pressure simultaneously. Either the neoprene layer, or the under-sidewall layer, or both, may be heated, as long as the contacting surface of the neoprene layer is in a soft, plastic condition as the two surfaces are pressed together.

An example of a suitable neoprene veneer stock used in the invention is as follows, all proportions being stated as parts by weight:

| | |
|---|---|
| Neoprene | 100 |
| Carbon black | 22 |
| Plasticizer | 11 |
| Anti-oxidant | 1 |
| Stearic acid | 1 |
| Sodium acetate | 0.5 |
| Magnesia | 4 |
| Zinc oxide | 5 |

The foregoing stock was employed with the following under-sidewall stock:

| | |
|---|---|
| Natural rubber | 100 |
| Carbon black | 40 |
| Plasticizer | 5 |
| Sulphur | 3 |
| Stearic acid | 3 |
| Zinc oxide | 3 |
| Accelerator | 1 |

The under-sidewall stock was first calendered to a thickness of 0.045 inch and rolled in a liner. A layer of the neoprene stock 0.015 inch thick was then applied to the under-sidewall stock with heat and pressure, and the tire was built up with the resulting laminate as a sidewall, as explained above.

It has been found that satisfactory results are also obtained by employing a neoprene veneer covering layer which is composed of a mixture of neoprene with natural rubber or with a suitable synthetic rubber, especially GR-S. Mixtures containing from 25 to 75 parts of neoprene and correspondingly 75 to 25 parts of other rubber may be used. A 50–50 mixture of neoprene with natural rubber is especially suitable.

Similarly, the under sidewall portion of the laminate may with equal satisfaction be made of synthetic rubber instead of natural rubber, or mixtures of natural rubber or synthetic rubber, with or without reclaimed rubber, may be used. The under-sidewall portion may, if desired, contain neoprene rubber, in amount of, for example, from 5 to 25% based on the total rubber content.

The following is an example of a veneer stock composed partly of natural rubber and partly of neoprene rubber:

| | |
|---|---|
| Natural rubber | 50 |
| Neoprene | 50 |
| Carbon black | 23 |
| Plasticizer | 7 |
| Sulphur | 1.3 |
| Stearic acid | 2.5 |
| Zinc oxide | 3 |
| Magnesia | 2 |
| Sodium acetate | 0.25 |
| Accelerator | 0.4 |

The foregoing veneer stock may be employed with the following under-sidewall stock:

| | |
|---|---|
| Natural rubber | 50 |
| GR-S | 50 |
| Reclaimed rubber | 100 |
| Carbon black | 40 |
| Plasticizer | 5 |
| Sulphur | 3.5 |
| Anti-oxidant | 1 |
| Zinc oxide | 3 |
| Accelerator | 1 |
| Diphenyl guanidine | 0.3 |

The invention is generally applicable to use with the various rubber formulae commonly employed in constructing tires. Furthermore, the invention makes it possible to employ more economical stocks in certain parts of the tire than would be permissible in conventional practice. Thus, the under-sidewall stock, since it is not exposed, may be made of a relatively inexpensive compound containing, for example, a high proportion of reclaim, that would ordinary not be suitable for use as a conventional sidewall. Similarly, the tread portion of the assembly may, if desired, be formed with the usual good quality wear-resistant stock in its center road-contacting, or cap, portion, and with a cheaper under-tread or base stock underneath the cap and at the tapered side portions, which are covered and protected by the neoprene laminate. Conventional formation of a tire casing with cap-and-base construction, that is, with a wear-resistant cap stock for the tread proper and a less wear-resistant, but flexible base stock under the tread and at the sidewalls, requires that the under-tread stock be capable of functioning as a sidewall. In the present construction a cheaper, heavily loaded stock may be used for the base stock.

Because of the laminated structure of the sidewall in the present method, it may be built up of superimposed layers of sufficient thinness to be formed by calendering, as opposed to conventional extruded sidewalls. The conventional extruded sidewall is frequently made thicker than is necessary or desirable, because of the limitation on thinness inherent in the extrusion operation, which is not adapted to forming of very thin shapes. The thinner sidewall structure made possible by the calendering procedure not only represents an economy with respect to the quantity and grade of rubber stocks used, but represents an improvement in the structural quality of certain designs of tire, where light, thin sidewalls are desired for proper flexing characteristics and minimum heat build up. The calendering method readily permits the sidewall to be as thin as 0.06″ or even less (without the carcass).

If desired, the neoprene laminate, instead of being made in two layers, may be made of three or more layers, the outer layer being made of an ozone-resistant stock relatively high in neoprene and the successive inner layers containing less neoprene until the under-sidewall layer containing little or no neoprene is reached. The successive layers may be made to adhere together by the hot pressurized assembly operation as described.

By overlapping the neoprene laminate over the tapered sides of the tread portion, a relatively large area of contact is provided between the under-sidewall portion and the tread portion, and by location of the terminal edge of the sidewall laminate at the edge of the road-contacting portion of the tread, it is found that there is no tendency for the joint between the sidewall laminate and the tread or undertread to open up when the tire is in use.

The combination of the neoprene layer with the under-sidewall layer under the influence of heat and pressure makes it possible to avoid the use of expensive and inconvenient adhesive preparations, while still insuring an integral structure. In fact, the employment of pressure and heat as described to unite the neoprene layer gives superior adhesion to that obtainable by any conventional cementing procedures, insofar as we are aware.

By uniting the neoprene layer with the under-sidewall stock at the calender, no additional heating step is required to effect the adhesion of the two strips, since the stock is heated to the proper temperature by the calender rolls.

A major advantage of the invention is that by previously assembling the neoprene veneer layer with an under-portion of rubber stock firmly adhered thereto, application of the veneer to the tire carcass is greatly facilitated since the under-portion of the assembly may be made of stock having naturally good adhesion to the remaining components of the tire.

Therefore, there is no necessity for the tire building operator to resort to any special adhesion procedures at the tire building drum. Thus, the previous assembling of a thin neoprene veneer with an under-layer of rubber stock having good adhesion to the tire carcass makes for convenience and economy in manufacturing the tire.

In addition, the practice of the invention is economical because only a relatively small amount of neoprene is required to give adequate protection.

The neoprene layer laminated with an under-portion of rubber stock having good adhesion to raw tire stock may be applied to the tread portion of the tire as well as the sidewall, or, if desired, it may be applied only to the tread groove portions of the tire.

Having thus described my invention, what I claim and desire to protect by Letters Patent is:

1. A method of making a pneumatic tire comprising the steps of calendering an unvulcanized neoprene layer, calendering a layer of unvulcanized rubber stock having good adhesion to raw tire carcass stock, hot-laminating the two unvulcanized layers by application of heat and pressure, subsequently applying the unvulcanized hot-laminated assembly to the outer surface of a raw tire, and vulcanizing the resulting assembly in tire shape.

2. A method of making a pneumatic tire comprising the steps of calendering a layer of vulcanizable rubber stock suitable for an under-sidewall portion of a tire, hot-laminating a thin layer of vulcanizable neoprene stock thereon, subsequently assembling the vulcanizable hot-laminate with raw tire carcass and tread portions, and vulcanizing the resulting assembly in tire shape.

3. A method of making a pneumatic tire comprising the steps of forming a vulcanizable tread portion with tapered side portions, forming a vulcanizable under-sidewall portion, forming a thin layer of vulcanizable neoprene, applying the thin layer of vulcanizable neoprene to the outer surface of the vulcanizable under-sidewall portion, uniting the thin layer of neoprene and the underside portion under the action of heat and pressure to form a laminated sidewall portion, subsequently associating the vulcanizable tread and laminated vulcanizable sidewall portion with the sidewall portion over-lapping the tapered side portions of the tread and the under-sidewall portion in contact with said tapered sides, associating the tread and sidewall laminate with a tire carcass, and shaping and vulcanizing the resulting assembly in the form of a tire.

4. A method of making a pneumatic tire comprising the steps of forming a thin layer of vulcanizable neoprene stock, forming a thin layer of vulcanizable rubber under-sidewall stock, firmly bonding the said vulcanizable layer of vulcanizable neoprene stock directly to the surface of the said layer of vulcanizable under-sidewall stock by simultaneous application of heat and pressure to the said vulcanizable layers, the surface of the neoprene layer being in direct, intimate contact with the surface of the under-sidewall layer, providing a raw tire carcass, subsequently applying the thus-assembled vulcanizable neoprene layer and under-sidewall layer to the raw tire carcass with the under-surface of the said under-sidewall layer in contact with the sidewall area of said raw tire carcass and the said neoprene layer forming the outer surface of the tire sidewall to provide a protective veneer thereon, and subsequently vulcanizing the entire assembly in tire shape.

5. A method of making a pneumatic tire comprising the steps of forming a thin layer of ozone-resistant and weather-resistant vulcanizable stock, forming a thin layer of vulcanizable under-sidewall stock, firmly bonding the said layer of vulcanizable ozone-resistant and weather-resistant stock directly to the surface of the said layer of vulcanizable under-sidewall stock by simultaneous application of heat and pressure to the said vulcanizable layers, the surface of the said ozone-resistant and weather-resistant layer being in direct, intimate contact with the surface of the under-sidewall layer, providing a raw tire carcass, subsequently applying the thus-assembled vulcanizable ozone-resistant and weather-resistant layer and under-sidewall layer to the raw tire carcass with the under-surface of the said under-sidewall layer in contact with the sidewall area of the said raw tire carcass and the said ozone-resistant and weather-resistant layer forming the outer surface of the tire sidewall to provide a protective veneer thereon, and subsequently vulcanizing the entire assembly in tire shape.

WILLIAM A. STEINLE.

References Cited in the file of this patent

UNITED STATES PATENTS

| Number | Name | Date |
|---|---|---|
| 2,170,947 | Habgood et al. | Aug. 29, 1939 |
| 2,405,943 | Doering et al. | Aug. 20, 1946 |
| 2,501,493 | Beward | Mar. 21, 1950 |
| 2,566,328 | Hessney et al. | Sept. 4, 1951 |